United States Patent
Takuma

(10) Patent No.: US 7,215,114 B2
(45) Date of Patent: May 8, 2007

(54) ROTATION ANGLE DETECTION DEVICE FOR A ROTATABLE BODY

(75) Inventor: Emi Takuma, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 92 days.

(21) Appl. No.: 10/869,908

(22) Filed: Jun. 18, 2004

(65) Prior Publication Data
US 2004/0257070 A1    Dec. 23, 2004

(30) Foreign Application Priority Data
Jun. 20, 2003  (JP)  ............... P2003-176435
Aug. 8, 2003   (JP)  ............... P2003-290662

(51) Int. Cl.
*G01B 7/30*   (2006.01)
(52) U.S. Cl. ........................... 324/207.25
(58) Field of Classification Search ........... 324/207.25
See application file for complete search history.

(56) References Cited

U.S. PATENT DOCUMENTS

| | | | |
|---|---|---|---|
| 5,930,905 A * | 8/1999 | Zabler et al. ............... 33/1 PT |
| 6,507,188 B1 | 1/2003 | Dilger et al. ........... 324/207.25 |

FOREIGN PATENT DOCUMENTS

| | | |
|---|---|---|
| JP | 2000-258188 | 9/2000 |
| JP | 2001-505667 | 4/2001 |
| JP | 2002-206910 | 7/2002 |
| JP | 2002-531858 | 9/2002 |
| WO | WO 03/036237 A1 | 5/2003 |

OTHER PUBLICATIONS

The American Heritage College Dictionary, 4th Edition, 2002, p. 414.*
Office Action Mailed Aug. 30, 2005 in corresponding Japanese Application No. 2003-290662.

* cited by examiner

*Primary Examiner*—Edward Lefkowitz
*Assistant Examiner*—David M. Schindler
(74) *Attorney, Agent, or Firm*—Finnegan, Henderson, Farabow, Garrett & Dunner, L.L.P.

(57) ABSTRACT

A rotation angle detection device capable of easy selection of detection gears is provided to detect a rotation angle of a main gear. The device includes first and second detection gears each rotatable in conjunction with the main gear, a first magnetic sensor for detecting a rotation angle of the first detection gear, a second magnetic sensor for detecting a rotation angle of the second detection gear, and a microcomputer for detecting the rotation angle of the main gear on the basis of the rotation angle detected by the first magnetic sensor and the rotation angle detected by the second magnetic sensor. The periodicity from the first magnetic sensor and the periodicity of the second magnetic sensor are set to be prime to each other. Further, the teeth number of the first magnetic sensor is set to be a numeric value obtained by multiplying the periodicity of the first magnetic sensor by a predetermined integral number. As well, the teeth number of the second magnetic sensor is set to be a numeric value obtained by multiplying the periodicity of the second magnetic sensor by a predetermined integral number.

5 Claims, 5 Drawing Sheets

ROTATION ANGLE DETECTION DEVICE FOR A ROTATABLE BODY

BACKGROUND OF THE INVENTION

The present invention relates to a rotation angle detection device equipped with a rotating main gear, for detecting a rotation angle of the main gear.

As a prior art, there is a known technology that allows a steering angle of a steering wheel to be detected uniquely even if the steering angle of the steering wheel exceeds 360 degrees (see Japanese Patent Application Laid-open No. 2002-531858). In detail, the above technology enables the steering angles of 370 degrees and 10 degrees to be distinguished from each other.

In this technology, a rotation angle detection device disclosed therein includes a main gear, first and second detection gears, first and second detection magnets, first and second magnetic sensors and a microcomputer.

In the rotation angle detection device, the main gear rotates integrally with a steering shaft of a vehicle, while the first and second detection gears rotate in conjunction with the main gear.

The first detection magnet, which is a magnet magnetized with two poles, rotates together with the first detection gear. Similarly, the second detection magnet also magnetized with two poles rotates together with the second detection gear.

The first magnetic sensor detects the directions of magnetic lines of the first magnet fixed on the first detection gear, that is, the rotation angle of the first detection gear and further outputs a detection signal in accordance with the detection result (i.e. detection angle). Similarly, the second magnetic sensor detects the directions of magnetic lines of the second magnet fixed on the second detection gear, that is, the rotation angle of the second detection gear and further outputs a detection signal in accordance with the detection result (i.e. detection angle).

The microcomputer calculates the rotation angle of the main gear based on the detection signals outputted from the first and second magnetic sensors.

Here noted that the number of teeth (or "teeth number") m1 of the first detection gear and the number of teeth (teeth number) m2 of the second detection gear are respectively established so as to meet a condition 1 or a condition 2 as follows:

$m2=m1+1$             (condition 1)

$|m1-m2|>1$ ($m1$ and $m2$ are prime to each other)        (condition 2)

When the numbers of teeth m1, m2 meet the above condition 1 or the condition 2, the combinations of detection signals from the first magnetic sensor with detection signals from the second magnetic sensor differ from each other so long as the rotation angles of the main gear corresponding to the combinations differ from each other, within the rotating range of the main gear, in other words, the steering range of a steering wheel. Therefore, if only given the detection signals from the first and second magnetic sensors, then it becomes possible to determine the rotation angle of the main gear uniquely.

That is, according to the above technology, even if the steering angle of the steering wheel exceeds 360 degrees in such a system that detects the rotation angle of the main gear on the ground of the rotation angles detected by the first magnetic sensor and the second magnetic sensor, it is possible to detect the rotating angle of the main gear, namely, the steering angle of the steering wheel uniquely.

However, the following problem resides in the above-mentioned technology. That is, as the detection gears used in the technology are respectively limited to ones meeting the above condition 1 or the above condition 2, the manufacturing of a device according to the technology requires the selection of gears that can be accommodated in such a device and further meet the condition 1 or the condition 2.

Thus, if there is a limitation in size of the device, it is complex to select appropriate gears.

SUMMARY OF THE INVENTION

Under the circumstances, it is therefore an object of the present invention to provide a rotation angle detection device that allows detection gears to be easily selected.

According to the first aspect of the present invention, the above object of the present invention described above can be accomplished by a rotation angle detection device for detecting a rotation angle of a main gear, comprising: first and second detection gears rotatable in conjunction with the main gear, respectively; first detecting unit configured to detect a rotation angle of the first detection gear and obtain a first periodicity that is the number of revolutions of the first detection gear rotating during the main gear's rotation from one limit value up to the other limit value within a rotatable range of the main gear; second detecting unit configure to detect a rotation angle of the second detection gear and obtain a second periodicity of the second detecting unit that is the number of revolutions of the second detection gear rotating during the main gear's rotation from one limit value up to the other limit value within the rotatable range of the main gear; and third detecting unit configured to detect the rotation angle of the main gear on a basis of the rotation angle detected by the first detecting unit and the rotation angle detected by the second detecting unit, wherein the first periodicity from the first detecting unit and the second periodicity from the second detecting unit are set to be prime to each other, wherein a teeth number of the first detection gear is set to be a numeric value obtained by multiplying the second periodicity from the second detecting unit by a predetermined integral number, and wherein a teeth number of the second detection gear is set to be a numeric value obtained by multiplying the first periodicity from the first detecting unit by the predetermined integral number.

In the above-constructed rotation angle detection device, since the first and second periodicities of the first and second detecting unit are set to be prime to each other, the third detecting unit can determine the rotation angle of the main gear uniquely. Further, regarding the teeth numbers of the first and second detection gears, the teeth numbers of the first and second detection gears can have any numeric values as long as meeting the condition described above.

In a preferred embodiment of the second aspect of the present invention, the teeth number of the first detection gear and the teeth number of the second detection gear may have a common divisor which is different from a divisor of the teeth number of the main gear.

Further, the main gear may be configured so as to rotate integrally with a steering shaft of a vehicle.

Further, the main gear may be configured so as to rotate in conjunction with a steering shaft of a vehicle.

Further, in another embodiment, the rotation angle detection device further comprises a first magnet arranged at the center of the first detection gear and magnetized with two poles and a second magnet arranged at the center of the second detection gear and magnetized with two poles, wherein the first detecting unit has a first magnetic sensor arranged in the vicinity of the first magnet to detect the rotation angle of the first detection gear within a range from 0 to 360 degrees in cooperation with the first magnet, and the second detecting unit has a second magnetic sensor arranged in the vicinity of the second magnet to detect the rotation angle of the second detection gear within a range from 0 to 360 degrees in cooperation with the second magnet.

Further, the third detecting unit may have a microcomputer configured to input respective signals from the first magnetic sensor and the second magnetic sensor.

These and other objects and features of the present invention will become more fully apparent from the following description and appended claims taken in conjunction with the accompanying drawings.

DESCRIPTION OF THE PREFERRED EMBODIMENT

Embodiments of the present invention will be described with reference to the drawings.

First, referring to FIGS. 1 and 2, the structure and function of constituents of a rotation angle detection device 1 in accordance with the first embodiment will be described. Noted that FIG. 1 is a schematic structural view of the rotation angle detection device 1 and FIG. 2 is a block diagram showing a control system of the rotation angle detection device 1.

Figure 1:
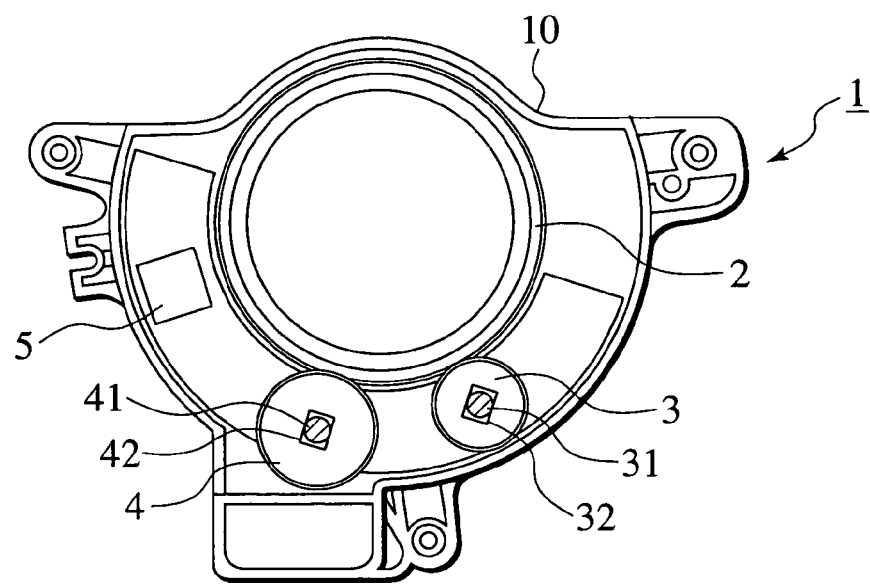
FIG. 1 is a schematic structural view of a rotation angle detection device in accordance with one embodiment of the present invention.
Figure 2:
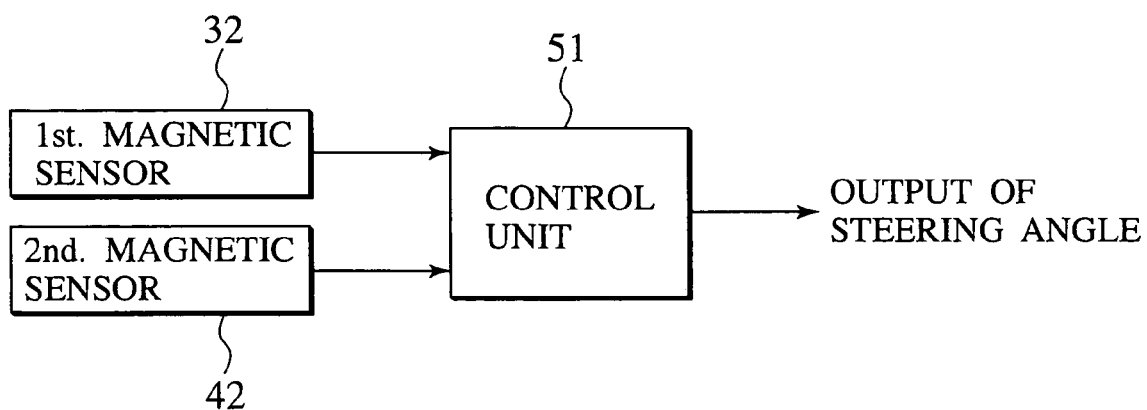
FIG. 2 is a block diagram showing a control system of the rotation angle detection device.

As shown in FIG. 1, the rotation angle detection device 1 is accommodated in a casing 10 and includes a main gear 2, a detection gear 3 (as the first detection gear of the invention), another detection gear 4 (as the second detection gear), two magnets 31 and 41, a magnetic sensor 32 (as the first detecting unit), another magnetic sensor 42 (as the second detecting unit) and a microcomputer (as the third detecting unit) 5.

The main gear 2 rotates integrally with a steering shaft of a vehicle (not shown). Accordingly, the steering angle of the steering shaft (or a steering wheel) coincides with the rotation angle of the main gear 2. Noted that the main gear 2 may be an element rotatable in conjunction with the steering shaft.

For instance, the rotatable range of the main gear 2 is from 0 to 1,440 degrees. Of course, the rotatable range of the main gear 2 may be different from the above range.

The detection gears 3, 4 rotate in conjunction with the main gear 2. In this embodiment, the number of teeth of the detection gear 4 is established larger than that of the detection gear 3. Therefore, the detection gear 4 rotates at a rotating speed smaller than that of the detection gear 3.

The magnet 31 (as the first magnet of the invention) is a magnet magnetized with two poles and is arranged at the rotational center of the detection gear 3. The magnet 31 rotates together with the detection gear 3.

The magnetic sensor 32 is arranged in the vicinity of the magnet 31 to detect the directions of magnetic lines of the magnet 31, in other words, the rotation angle of the detection gear 3 within a range from 0 to 360 degrees. Additionally, the magnetic sensor 32 produces a detection signal of n-bit (e.g. 6 to 10 bit) corresponding to the detected rotation angle and outputs the detection signal to the microcomputer 5. The magnetic sensor 32 is constructed so as to output a detection signal having a larger value as the detected rotation angle gets larger.

Similarly, the magnetic sensor 42 (as the second magnet) is arranged in the vicinity of the magnet 41 to detect the directions of magnetic lines of the magnet 41, in other words, the rotation angle of the detection gear 4 within a range from 0 to 360 degrees. Additionally, the magnetic sensor 42 produces a detection signal of n-bit (e.g. 6 to 10 bit) corresponding to the detected rotation angle and outputs the detection signal to the microcomputer 5. The magnetic sensor 42 is constructed so as to output a detection signal having a larger value as the detected rotation angle gets larger.

In order to allow the microcomputer 5 to determine the rotation angle of the main gear 2 uniquely even if it exceeds 360 degrees, it is established that the cycle $c_1$ of the magnetic sensor 32 and the cycle $c_2$ of the magnetic sensor 42 meet the following expression (1). Noted that the cycle $c_1$ of the magnetic sensor 32 indicates a rotation angle of the main gear 2 rotating during one revolution of the detection gear 3, while the cycle $c_2$ of the magnetic sensor 42 indicates a rotation angle of the main gear 2 rotating during one revolution of the detection gear 4.

$$\text{A least common multiple of the cycles } c_1 \text{ and } c_2 \geq \text{rotatable range of the main gear 2} \quad (1)$$

Therefore, according to the embodiment, the cycles $c_1$ and $c_2$ are respectively established so that the least common multiple is more than 1,440 degrees.

As shown in FIG. 2, the microcomputer 5 includes a control unit 51. Based on the detection signals from the magnetic sensors 32 and 42, the control unit 51 does determine or detect the rotation angle of the main gear 2 uniquely. In succession, the control unit 51 produces an angular signal corresponding to the so-determined rotation angle and further outputs the angular signal to a not-shown instrument requiring the data of the rotation angle of the main gear 2 (i.e. steering shaft).

Figure 3:
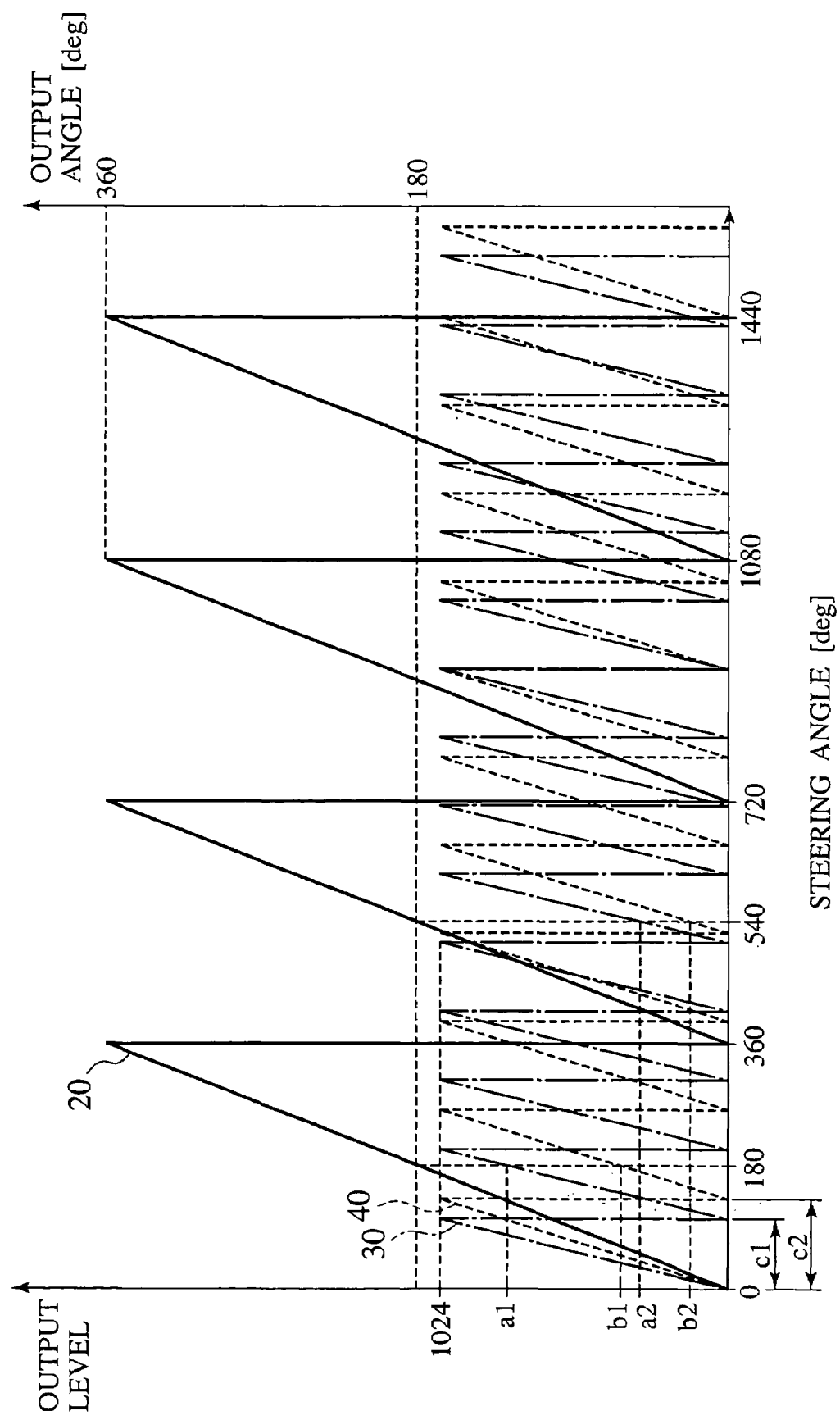
FIG. 3 is a characteristic diagram showing a relationship between the rotation angles of a main gear and the values of detection signals from a magnetic sensor.
Figure 4:
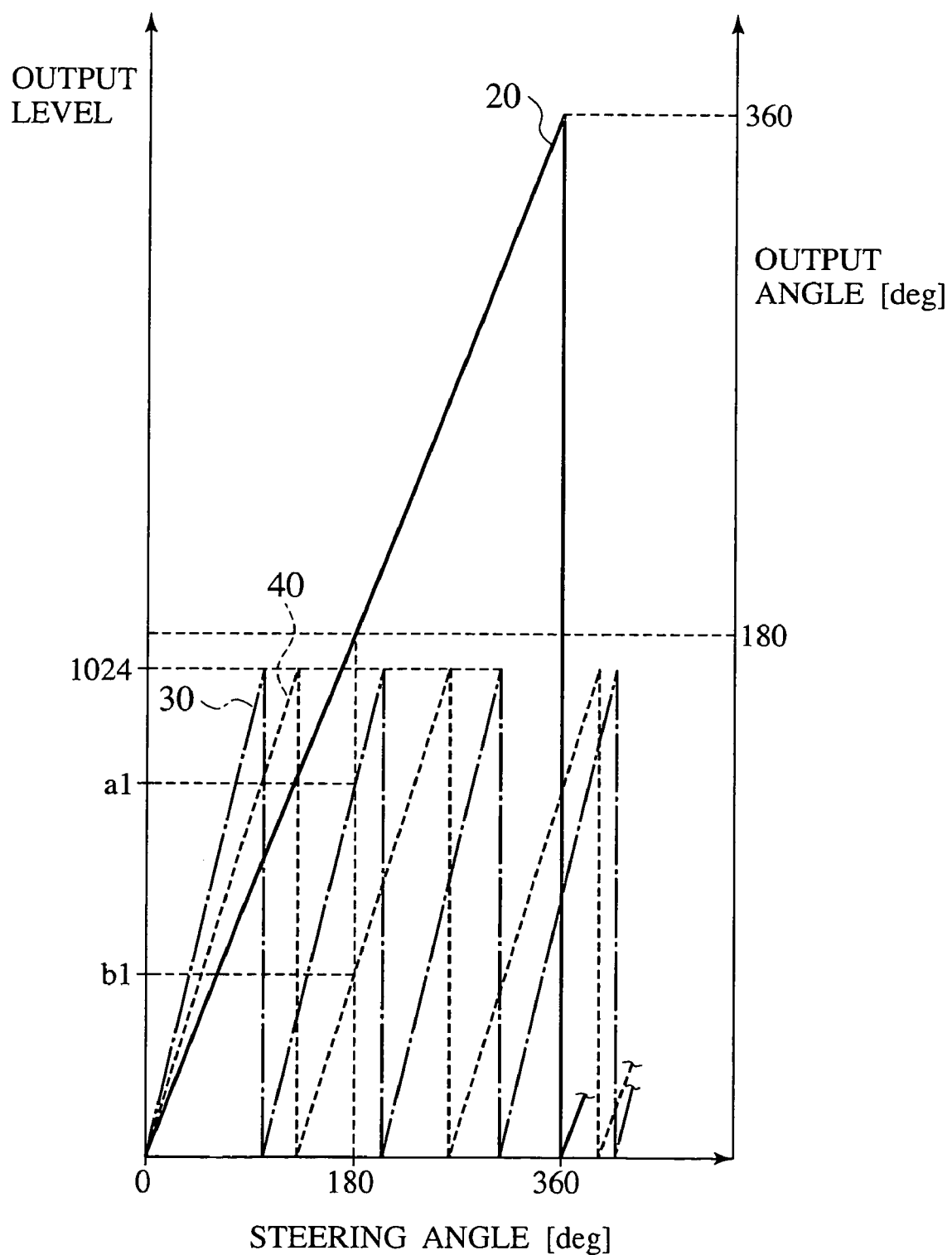
FIG. 4 is a characteristic diagram showing a part of FIG. 3 in enlargement.

Referring to FIGS. 3 and 4, we now describe the reason why the above establishment of the cycles $c_1$ and $c_2$ in accordance with the expression (1) allows the rotation angle of the main gear 2 to be determined uniquely. FIG. 3 is a characteristic view showing the relationship among the rotation angle of the main gear 2 (i.e. steering angle of the steeling wheel), the values of the detection signals outputted from the magnetic sensors 32, 42 under condition that the cycles $c_1$ and $c_2$ meet the expression (1). FIG. 4 is a characteristic view showing a part of FIG. 3 in enlargement. Noted that the number n of bits is equal to ten in FIGS. 3 and 4 (i.e. n=10).

A kinked solid line 20 of FIG. 3 designates the relationship between the steering angle (horizontal axis) and the rotation angle (vertical axis) of the main gear 2 within the range from 0 to 360 degrees. On the other hand, a dotted line 30 designates the relationship between the rotation angle (horizontal axis) of the main gear 2 and the value (vertical axis) of an output signal from the magnetic sensor 32. Similarly, a broken line 40 designates the relationship between the rotation angle (horizontal axis) of the main gear 2 and the value (vertical axis) of an output signal from the magnetic sensor 42.

As shown in FIG. 3, the cycle c1 is set to approximately 100 degrees, while the cycle c2 is set to approximately 128 degrees. Therefore, the least common multiple of the cycles c1 and c2 is approximately 3,200 degrees. Then, the values of cycles c1 and c2 meet the expression (1).

In the rotating range (from 0 to 1,440 degrees) of the main gear 2, as shown in FIG. 3, the combinations of the detection signals from the magnetic sensor 32 with the detection signals from the magnetic sensor 42 differ from each other if the rotation angles of the main gear 2 corresponding to the combinations differs from each other, despite that the rotation angles of the main gear 2 are equal to each other within the range from 0 to 360 degrees. Therefore, if the detection signals from the magnetic sensors 32 and 42 are obtained respectively, it is possible for the control unit 51 to determine the rotation angle of the main gear 2 uniquely.

For instance, as shown in FIGS. 3 and 4, when two rotation angles of the main gear 2 are 180 degrees and 540 degrees respectively (each corresponding to 180 degrees in the range from 180 to 360 degrees), the values of the detection signals from the magnetic sensor 32 respectively exhibit different values a1, a2, while the values of the detection signals from the magnetic sensor 42 respectively exhibit different values b1, b2. Therefore, when the rotating angle of the main gear 2 is 180 degrees, there is established a combination consisting of the values a1 and b1. While, when the rotating angle of the main gear 2 is 540 degrees, there is established another combination consisting of the values a2 and b2. In this way, two combinations are different from each other.

In other words, if the combination of two detection signals from the magnetic sensors 32 and 42 is formed by the values (a1, b1), the control unit 51 can determine that the rotation angle of the main gear 2 is equal to 180 degrees. Similarly, if the combination of two detection signals from the magnetic sensors 32 and 42 is formed by the values (a2, b2), the control unit 51 can determine that the rotation angle of the main gear 2 is equal to 540 degrees.

In this case, the number of teeth z1 of the detection gear 3 and the number of teeth z2 of the detection gear 4 are respectively established so as to meet the following expressions (2) and (3).

$$z1 = f \times x2 \quad (2)$$

$$z2 = f \times x1 \quad (3)$$

Note; x2: first periodicity of magnetic sensor 42
x1: second periodicity of magnetic sensor 32
f: an integral number more than 1

Here, we explain the reason why the teeth numbers z1 and z2 can be established in the above way. If the cycle c1 of the magnetic sensor 32 and the cycle c2 of the magnetic sensor 42 meet the expression (1), the first periodicity x1 of the magnetic sensor 32 and the second periodicity x2 of the magnetic sensor 42 are prime to each other. Here noted that the first periodicity x1 is the number of revolutions of the detection gear 3 during the rotation of the main gear 2 from one limit value within its rotatable range up to the other limit value. Similarly, the second periodicity x2 is the number of revolutions of the detection gear 4 during the rotation of the main gear 2 from one limit value within its rotatable range up to the other limit value.

Additionally, the following expressions (4), (5) and (6) come into existence.

$$(\text{rotatable range of main gear 2}) = c1 \times x1 = c2 \times x2 \quad (4)$$

$$c1 = 360 \times z1/z0 \quad (5)$$

$$c1 = 360 \times z2/z0 \quad (6)$$

Note; z0: number of main gear 2

When substituting the expressions (5) and (6) into the expression (4), there is obtained the following expression (7).

$$z1 \times x1 = z2 \times x2 \quad (7)$$

Additionally, the following expressions (8) and (9) are obtained by the above expression (7).

$$z1 = z2 \times x2/x1 \quad (8)$$

$$z2 = z1 \times x1/x2 \quad (9)$$

By the following facts: the first and second periodicities x1 and x2 are prime to each other; the teeth numbers z1 and z2 are integral numbers more than 1; and the expressions (8) and (9), the following expressions (10) and (11) are obtained. Here, both alphabets "d" and "e" are integral numbers more than 1.

$$z1 = d \times x2 \quad (10)$$

$$z2 = e \times x1 \quad (11)$$

When substituting the expressions (10) and (11) into the expression (7), there is obtained the following expression (12). Here, alphabet "f" is an integral number more than 1.

$$d = e = f \quad (12)$$

Then, when substituting the expression (12) into the expressions (10) and (11), the above-mentioned expressions (2) and (3) are obtained.

Therefore, if only establishing the teeth numbers z1 and z2 so as to meet the expressions (2) and (3), the control unit 51 can determine the rotation angle of the main gear 2 uniquely since the cycles c1 and c2 meet the expression (1) immediately. In the example shown in FIG. 3, the teeth numbers z0, z1 and z2 are 90, 25 and 32, respectively while meeting the expressions (2) and (3).

Figure 5:
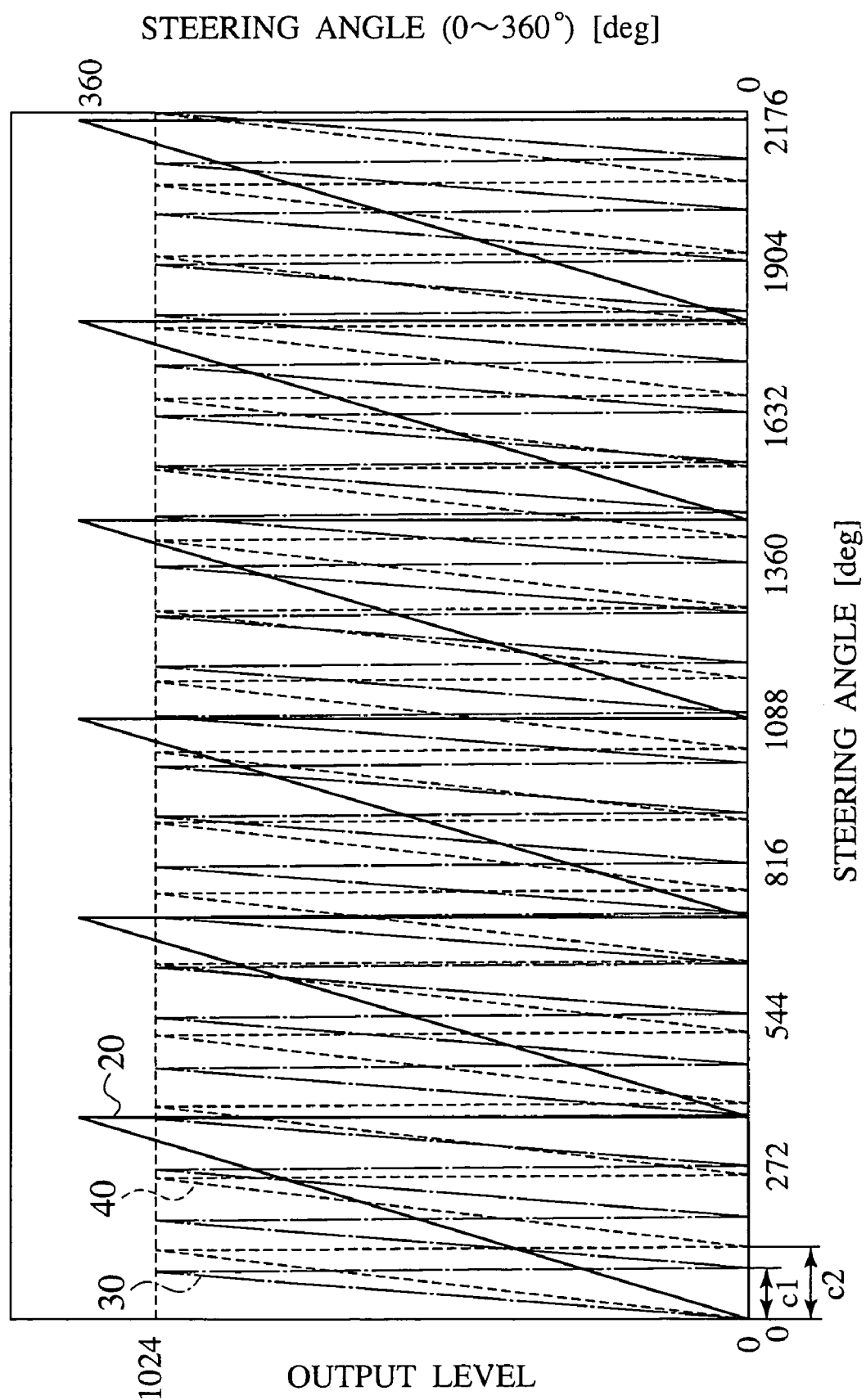
FIG. 5 is a characteristic diagram showing a relationship between the rotation angles of a main gear and the values of detection signals from a magnetic sensor.
Figure 6:
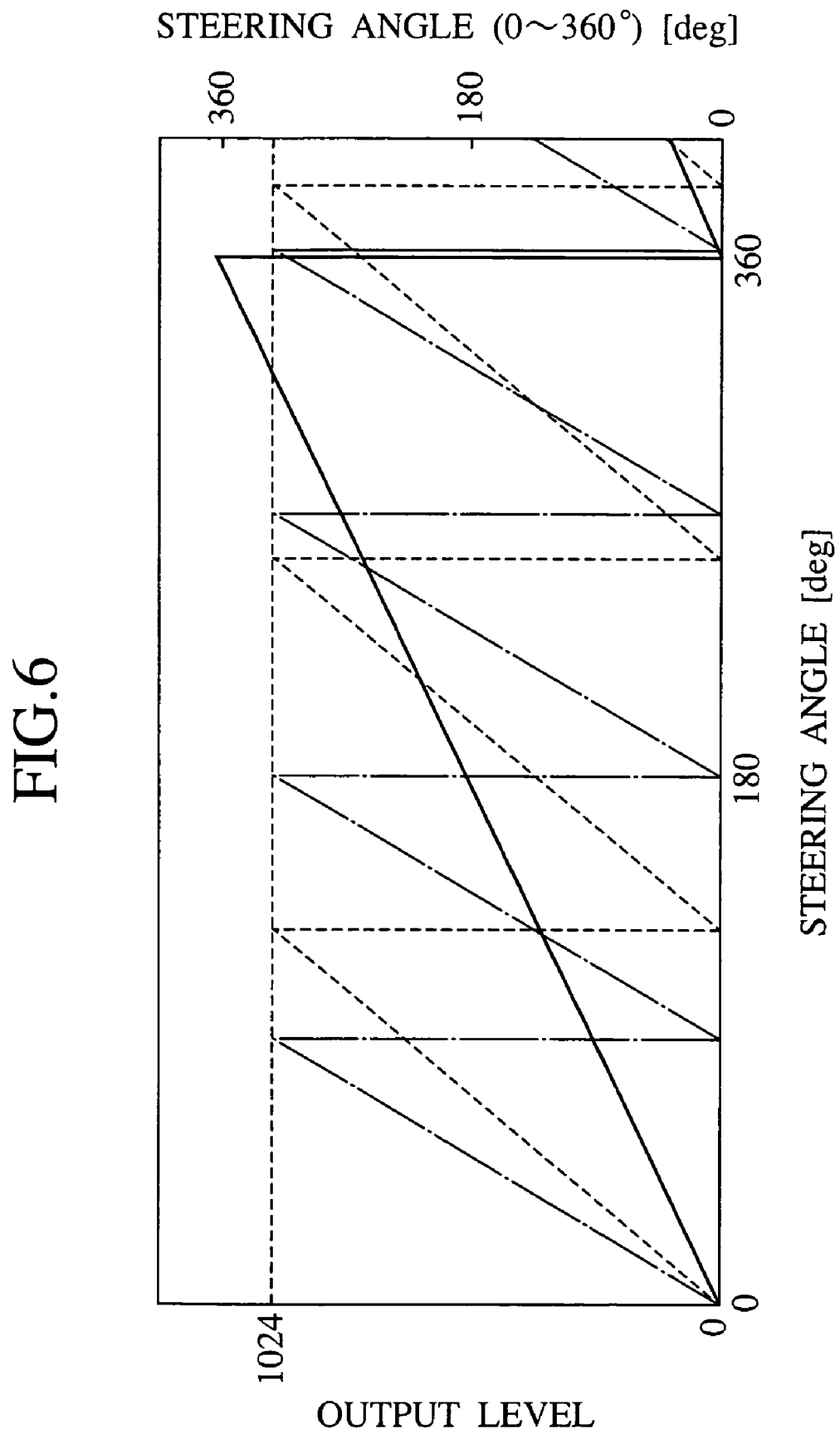
FIG. 6 is a characteristic diagram showing a part of FIG. 5 in enlargement.

As for the cycles c1 and c2 meeting the expression (1), the cycles shown in FIGS. 5 and 6 will be quoted besides those of FIGS. 3 and 4. Here, FIGS. 5 and 6 are characteristic views similar to FIGS. 3 and 4.

In an example of FIG. 5, the cycle c1 is set to approximately 90.7 degrees, while the cycle c2 is set to approximately 128 degrees. Therefore, the least common multiple of the cycles c1 and c2 is approximately 2,176 degrees. Then, the values of cycles c1 and c2 meet the expression (1). In this example, the teeth numbers z0, z1 and z2 are 135, 34 and 48, respectively while meeting the expressions (2) and (3).

In this way, according to the embodiment, since the first periodicity x1 of the magnetic sensor 32 and the second periodicity x2 of the magnetic sensor 42 are prime to each other, the control unit 51 can determine the rotation angle of the main gear 2 uniquely.

As for the teeth number z1 of the detection gear 3 and the teeth number z2 of the detection gear 4, any numbers will do so long as they meet the above expressions (2) and (3). Thus, since the range of choice in the teeth numbers of the detection gears 3 and 4 is broadened in comparison with the conventional art, it is possible to select the detection gears 3 and 4 easily in even a situation where there exists a limitation in the size of the rotation angle detection device 1. As the combinations of the teeth numbers that are not included in the prior art, it is noted that there are the following combinations (z0, z1, z2) of: (135, 38, 48); (135, 24, 62); (135, 24, 58); (135, 34, 48); (135, 48, 26); and (135, 50, 24).

Further, regarding the combinations of the main gear 2 and the detection gears 3 and 4, when there exists a common divisor between the teeth number z1 of the detection gear 3 and the teeth number z2 of the detection gear 4, there can be selected the above-mentioned combinations where the above common divisor is different from divisors of the teeth number z0 of the main gear 2.

Again, as the main gear 2 rotates integrally with the steering shaft of the vehicle, it is possible to determine the steering angle of the steering wheel uniquely. Additionally, even if the size of the rotation angle detection device 1 is limited in view of mounting the device 1 on the vehicle, it is possible to easily select the detection gears 3, 4.

Although the above embodiment is described on the assumption that the main gear 2 rotates integrally with the steering shaft of the vehicle, the main gear 2 may be constructed to rotate in conjunction with the steering shaft of the vehicle in the modification. Alternatively, the main gear 2 may be constructed to rotate in conjunction with the other rotating element (not shown).

Finally, it will be understood by those skilled in the art that the foregoing descriptions are nothing but one embodiment of the disclosed rotation angle detection device and therefore, various changes and modifications may be made within the scope of claims.

What is claimed is:

1. A rotation angle detecting device for detecting a rotation angle of a main gear, comprising:
    first and second detection gears having a first number of teeth and a second number of teeth, respectively, rotatable in conjunction with the main gear having a third number of teeth and a rotatable range from a first value up to a second value;
    a first detecting unit configured to detect a rotation angle of the first detection gear, wherein a cycle of the first detecting unit indicates the rotation angle of the main gear rotating during one revolution of the first detection gear;
    the second detecting unit configured to detect a rotation angle of the second detection gear, wherein a cycle of the second detecting unit indicates the rotation angle of the main gear rotating during one revolution of the second detection gear; and
    a third detecting unit configured to detect the rotation angle of the main gear on a basis of the rotation angle detected by the first detecting unit and the rotation angle detected by the second detecting unit,
    wherein a least common multiple of the cycle of the first detecting unit and the cycle of the second detecting unit is greater than or equal to the rotatable range of the main gear,
    wherein a first periodicity of the first detecting unit is a number of revolutions of the first detection gear during the rotation of the main gear, and a second periodicity of the second detecting unit is a number of revolutions of the second detection gear during the rotation of the main gear, the first and second periodicities being prime to each other,
    wherein the first number of teeth of the first detection gear is set to be a numeric value obtained by multiplying the second periodicity from the second detecting unit by a predetermined integral number, and the second number of teeth of the second detection gear is set to be a numeric value obtained by multiplying the first periodicity from the first detecting unit by the predetermined integral number, and
    wherein the first and second number of teeth of the first and second detection gears are dividends set to have a common whole number divisor greater than one, which results in a whole number quotient, and is different from a divisor of the third number of teeth of the main gear.

2. The rotation angle detection device as claimed in claim 1, wherein the main gear is configured so as to rotate integrally with a steering shaft of a vehicle.

3. The rotation angle detection device as claimed in claim 1, wherein the main gear is configured so as to rotate in conjunction with a steering shaft of a vehicle.

4. The rotation angle detection device as claimed in claim 1, further comprising:
    a first magnet arranged at a center of the first detection gear and magnetized with two poles; and
    a second magnet arranged at a center of the second detection gear and magnetized with two poles,
    wherein the first detecting unit has a first magnetic sensor arranged in the vicinity of the first magnet to detect the rotation angle of the first detection gear within a range from 0 to 360 degrees in cooperation with the first magnet, and wherein the second detecting unit has a second magnetic sensor arranged in the vicinity of the second magnet to detect the rotation angle of the second detection gear within a range from 0 to 360 degrees in cooperation with the second magnet.

5. The rotation angle detection device as claimed in claim 4, wherein the third detecting unit has a microcomputer configured to input respective signals from the first magnetic sensor and the second magnetic sensor.

* * * * *